US010733860B1

(12) United States Patent
Jondu et al.

(10) Patent No.: US 10,733,860 B1
(45) Date of Patent: Aug. 4, 2020

(54) SYSTEMS AND METHODS FOR IDENTIFYING AND RESPONDING TO A POTENTIAL THREAT

(71) Applicant: Ademco Inc., Golden Valley, MN (US)

(72) Inventors: Lokanatha Reddy Jondu, Bangalore (IN); Kalpaga Kanakarajan, Bangalore (IN); Samidurai Krishnamoorthy, Thanjavur (IN); Ashok Periasamy, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/277,121

(22) Filed: Feb. 15, 2019

(51) Int. Cl.
G05B 15/02 (2006.01)
G08B 13/22 (2006.01)
H04L 29/08 (2006.01)
H04L 12/28 (2006.01)
G08B 27/00 (2006.01)

(52) U.S. Cl.
CPC ............ G08B 13/22 (2013.01); G05B 15/02 (2013.01); H04L 12/2816 (2013.01); H04L 67/12 (2013.01); G08B 27/003 (2013.01)

(58) Field of Classification Search
None
See application file for complete search history.

(56) References Cited

U.S. PATENT DOCUMENTS

| 6,956,478 | B2 | 10/2005 | Oyagi et al. |
| 9,183,735 | B1* | 11/2015 | Pineau ............... G08B 29/02 |
| 9,819,713 | B2 | 11/2017 | Siminoff et al. |
| 10,514,669 | B1* | 12/2019 | Call ................ G06Q 30/0278 |
| 2007/0182543 | A1 | 8/2007 | Luo |
| 2014/0266669 | A1* | 9/2014 | Fadell ............... G08B 27/003 340/501 |
| 2017/0243472 | A1 | 8/2017 | Davies et al. |

OTHER PUBLICATIONS

Ring, Controlling Ring Neighbors Through the Ring App, Sep. 29, 2017.

* cited by examiner

Primary Examiner — Brent Swarthout
(74) Attorney, Agent, or Firm — Husch Blackwell LLP

(57) ABSTRACT

Systems and methods for identifying and responding to a potential threat at a location monitored by a smart home system are provided. Such systems and methods can include a central system receiving a notification of a suspicious incident detected at the location and current data related to the suspicious incident from the smart home system, the central station analyzing the current data to confirm or reject the suspicious incident, when the central system confirms the suspicious incident, the central station determining whether the current data is indicative of a potential threat, and when the central station determines that the current data is indicative of the potential threat, the central station storing the current data for future use and initiating a security action to alleviate the potential threat.

16 Claims, 2 Drawing Sheets

SYSTEMS AND METHODS FOR IDENTIFYING AND RESPONDING TO A POTENTIAL THREAT

FIELD

The present invention relates generally to smart home systems. More particularly, the present invention relates to systems and methods for identifying and responding to a potential threat at a location monitored by a smart home system.

BACKGROUND

A substantial amount of valuable property is stolen as a result of property-related crimes, such as larceny, burglary, and motor vehicle theft, on a yearly basis. Criminals are increasingly able to avoid detection by known detection methods and security systems even though some portion of their criminal activity can be observed by those security systems and even the public at large.

In view of the above, there is a continuing, ongoing need for improved systems and methods.

DETAILED DESCRIPTION

Figure 1:
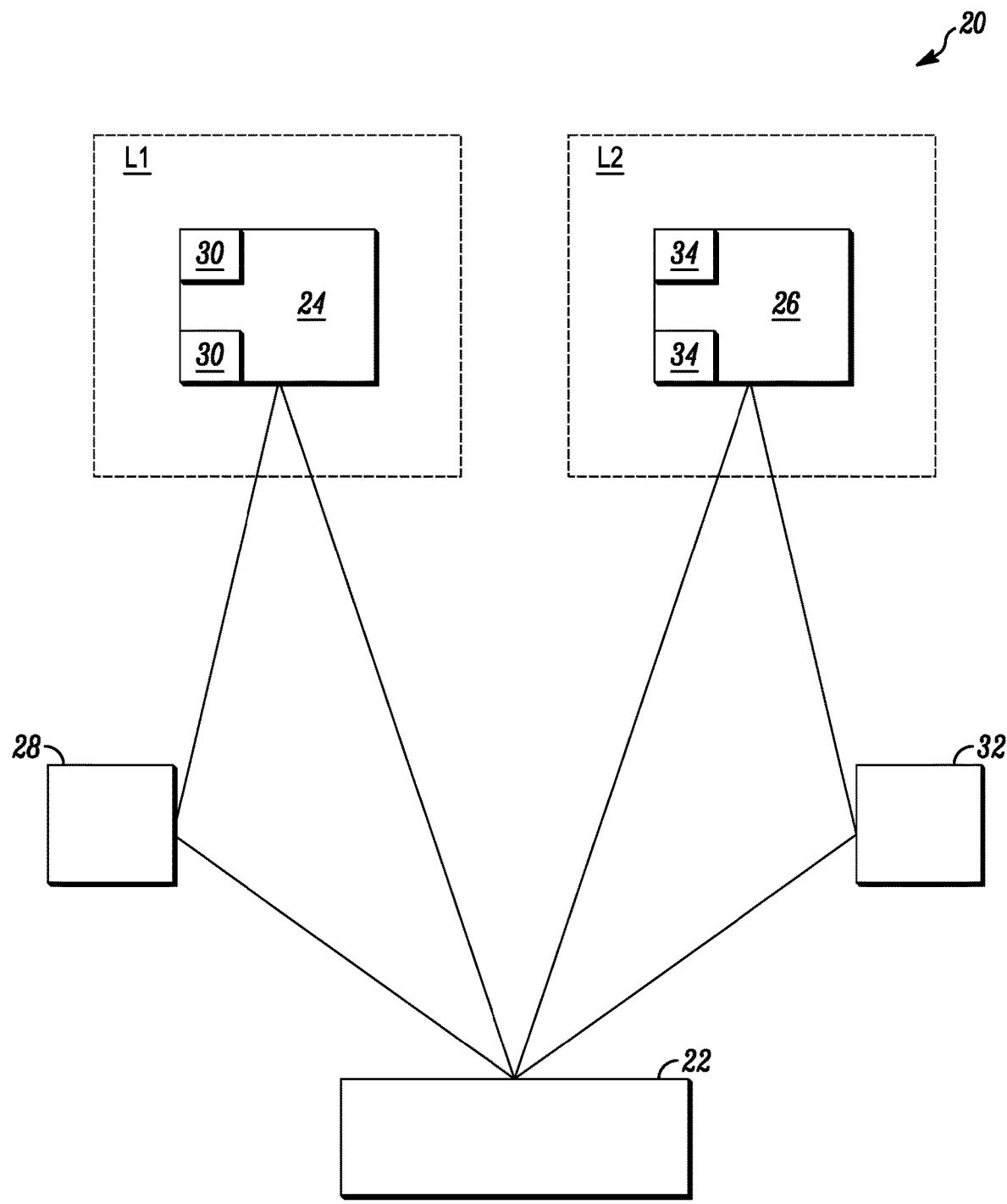
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for identifying and responding to a potential threat at a location monitored by a smart home system. Such systems and methods can include a first smart home system that monitors a first location, a second smart home system that monitors a second location neighboring the first location, a user device associated with the second smart home system, and a central system in communication with the first smart home system, the second smart home system, and the user device associated with the second smart home system.

The systems and methods disclosed herein can include the central system receiving a notification of a suspicious incident and current data related to the suspicious incident from the first smart home system and, responsive thereto, analyzing the current data to confirm or reject the suspicious incident and/or transmitting the notification of the suspicious incident to the second smart home system and/or the user device associated with the second smart home system. When the central system rejects the suspicious incident, the central system can store the current data for future use, but when the central system confirms the suspicious incident, the central system can determine whether the current data is indicative of a potential threat. In some embodiments, the central system can consult expert data, such as criminal databases and local crime trends provided by authorities, to confirm the suspicious incident. When the central system determines that the current data is not indicative of the potential threat, the central system can store the current data for future use, but when the central system determines that the current data is indicative of the potential threat, the central system can both store the current data for future use and initiate a security action to alleviate the potential threat.

In some embodiments, when the current data is indicative of the potential threat, the central system can transmit a notification of the potential threat and/or the security action to a user device associated with the first smart home system and/or the user device associated with the second smart home system via any of the methods described herein, including but not limited to direct messaging and publishing to a group chat thread.

In some embodiments, the central system can identify the user device as being associated with the second smart home system before transmitting the notification of the suspicious incident and the security action to the user device associated with the second smart home system. For example, the notification of the suspicious incident and the current data that the central system receives from the first smart home system can include reference information that informs the central system that a source of the notification of the suspicious incident and the current data is the first smart home system and/or the first location. The central system can use the reference information to search a global database or a database specific to the first smart home system or the first location to identify the second smart home system and the second location as neighboring the first location. In some embodiments, the central system can also identify the user device associated with the second smart home system or a contact method for the user device associated with the second smart home system from the global database or the database specific to the first smart home system or the first location. Then, the central system can transmit the notification of the suspicious incident and the security action to the user device associated with the second smart home system, for example, via the contact method as identified in the global database or the database specific to the first smart home system.

In some embodiments, the contract method can include a direct method of contact for the user device associated with the second smart home system, such as a phone number or an email address. Additionally or alternatively, in some embodiments, the contact method can include a group thread or a chat session to which the user device associated with the second smart home system and any other user devices associated with smart home systems that neighbor the first smart home system, including the user device associated with the first smart home system, are subscribed. In some embodiments, the central system can identify the group thread or the chat session directly in the global database or the database specific to the first smart home system or the first location using only the reference information and without first identifying the second smart home system.

In some embodiments, the central system can receive the notification of the suspicious incident responsive to user input at the first smart home system or the user device associated with the first smart home system such that the user input can be indicative of the current data. For example, the user input can include an indication by a user of the first smart home system or the user device associated with the first smart home system that suspicious people have been lurking around the first location, and the indication can include a description of the suspicious people. Additionally or alternatively, in some embodiments, the central system can receive the notification of the suspicious incident responsive to security system devices of the first smart home system gathering the current data. For example, the security system devices of the first smart home system, such as cameras, proximity sensors, and/or movement alarms, can be triggered by one or more security conditions that are indicative of the suspicious incident and, responsive thereto, can transmit the current data to the central system directly or via a control panel of the first smart home system.

In some embodiments, the central system can compare the current data to historical data from the first smart home system or the second smart home system stored in a memory device of the central system. The central system can identify similarities between the current data and the historical data and, responsive thereto, can determine whether the current data is indicative of the potential threat. In some embodiments, the central system can identify the potential threat when a number of the similarities between the current data and the historical data is greater than a predetermined threshold number. Additionally or alternatively, in some embodiments, the central system can compare the current data to the expert data to determine whether the current data is indicative of the potential threat.

In some embodiments, the central system can assign one or more tags to the suspicious incident based on the current data. For example, the one or more tags can include location information, date and time information, identifying characteristics of individuals potentially involved in the suspicious incident, and/or a number of any of the individuals potentially involved in the suspicious incident, among others. In some embodiments, a format and a type of the one or more tags can be preconfigured. In some embodiments, the central system can compare the one or more tags to historical tags associated with the historical data and determine that the current data is indicative of the potential threat when a number of matches between the one or more tags the historical tags exceeds a preconfigured threshold.

In some embodiments, the central system can transmit the notification of the suspicious incident to the second smart home system and/or the user device associated with the second smart home system when the central system rejects the suspicious incident. However, in any embodiment, responsive to sending the notification of the suspicious incident to the second smart home system or the user device associated with the second smart home system, the central system can receive additional data related to the suspicious incident from the second smart home system or the user device associated with the second smart home system. For example, in some embodiments, a user of the second smart home system or the user device associated with the second smart home system can confirm that one or more people matching a description contained in the notification of the suspicious incident have been seen lurking around the second location of the second smart home system. Then, the central system can determine whether a combination of the current data and the additional data is indicative of the potential threat. When the central system determines that the combination of the current data and the additional data is not indicative of the potential threat, the central system can store the current data and the additional data for future use, but when the central system determines that the combination of the current data and the additional data is indicative of the potential threat, the central system can initiate the security action to alleviate the potential threat.

In some embodiments, the central system can use the current data, the historical data, and the additional data to determine whether the first location or the second location is a target of the potential threat. In such embodiments, the security action can include at least one of transmitting the notification of the potential threat and/or the security action to another user device associated with the first smart home system or the user device associated with the second smart home system, arming the first smart home system or the second smart home system, or activating security or smart devices of the first smart home system or the second smart home system to mimic an occupant being present at the first location or the second location. Additionally or alternatively, in some embodiments, the security action can include the central system transmitting the notification of the potential threat and/or the security action to authorities.

FIG. 1 is a block diagram of a system 20 in accordance with disclosed embodiments. As seen in FIG. 1, the system 20 can include a central system 22, a first smart home system 24 monitoring a location L1, and a second smart home system 26 monitoring a location L2. In some embodiments, the first smart home system 24 can include security devices 30 and can communicate with a user device 28, and the second smart home system can include security devices 34 and can communicate with a user device 32. Both the user device 28 and the user device 32 can also communicate with the central system 22, and first smart home system 24, the second smart home system 26, the user device 28, and the user device 32 can communicate with each other and the central system 22 via wired and wireless mediums known in the art.

Figure 2:
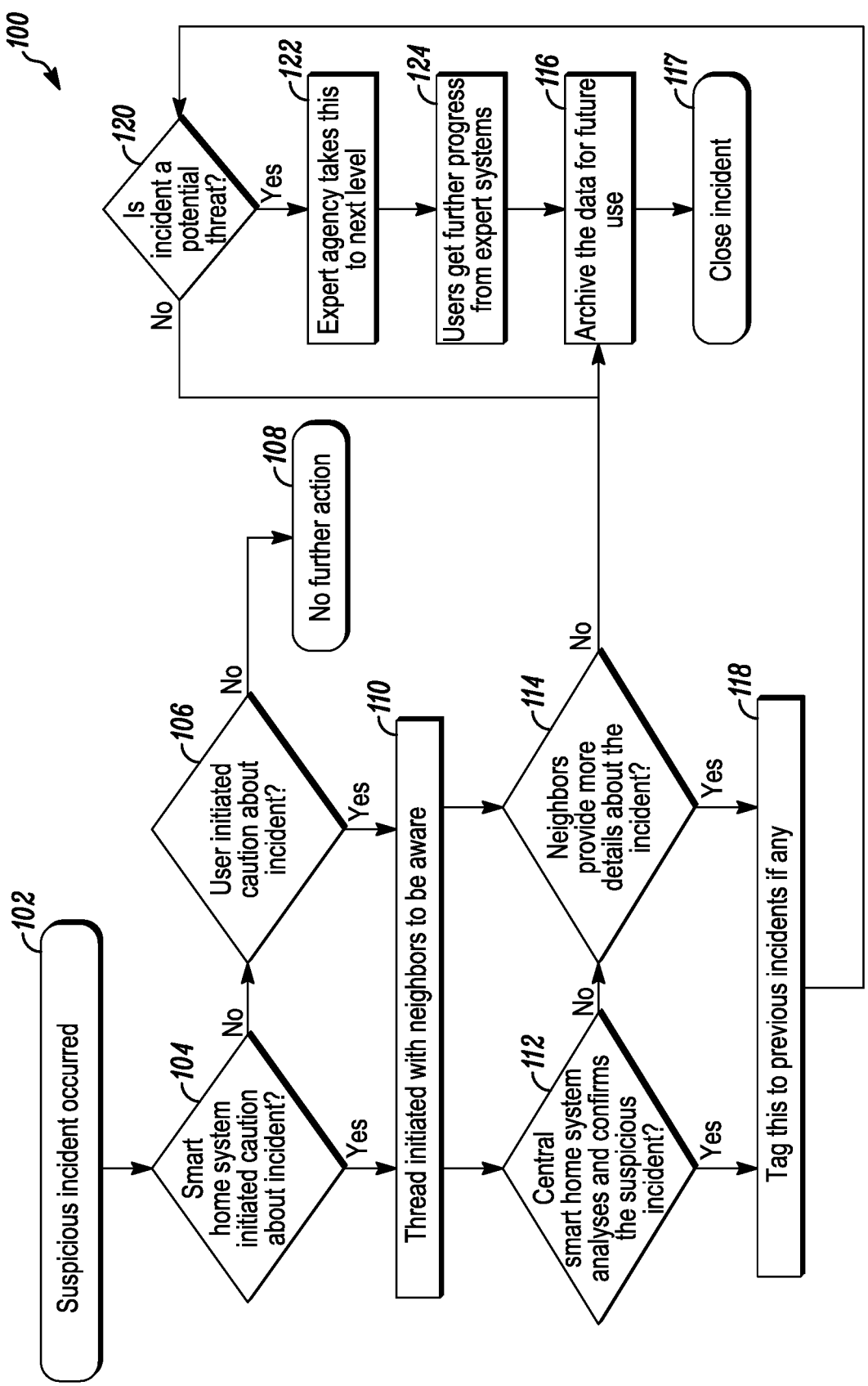
FIG. 2 is a flow diagram of a method in accordance with disclosed embodiments.

FIG. 2 is a flow diagram of a method 100 in accordance with disclosed embodiments. As seen in FIG. 2, the method 100 can include a suspicious incident occurring, as in 102. Then, the method 100 can include a central system 22 determining whether it has received a notification of the suspicious incident and current data related to the suspicious incident from the first smart home system 24, for example, responsive to the security devices 30 detecting the suspicious incident or responsive to the first smart home system 24 receiving user input, as in 104. If not, then the method 100 can include the central system 22 determining whether it has received the notification of the suspicious incident and the current data from the user device 28, as in 106. If not, then the method 100 can include taking no further action, as in 108.

However, when the central system 22 receives the notification of the suspicious incident and the current data from either of the first smart home system 24, as in 104, or the user device 28, as in 106, some embodiments of the method 100 can include the central system 22 transmitting the notification of the suspicious incident to the user device 32, as in 110. In some embodiments, the method 100 can include the central system 22 transmitting the notification of the suspicious incident to the user device 32 by publishing the notification of the suspicious incident to a group chat thread to which the user device 32 is subscribed, and in some embodiments, the user device 28 can also be subscribed to the group chat thread.

As seen in FIG. 2, when the central system 22 receives the notification of the suspicious incident and the current data, as in 104 or 106, the method 100 can include the central system 22 analyzing the current data to confirm or deny the suspicious incident, as in 112. If the central system denies the suspicious incident, as in 112, then the method 100 can include the central system 22 soliciting additional data related to the suspicious incident from the second smart home system 26 or the user device 32, as in 114. In some embodiments, the central system can receive the additional data without soliciting the additional data from the second smart home system 26 or the user device 32. In some embodiments, the method 100 can include the central system 22 receiving the additional data via the group chat thread. If the central system 22 fails to receive any additional data, as in 114, then the method 100 can include the central system 22 storing the current data for future use, as in 116, and closing the suspicious incident, as in 117.

However, when the central system 22 confirms the suspicious incident, as in 112 or receives the additional data, as in 114, then the method 100 can include the central system 22 identifying historical data from the first smart home system 24 or the second smart home system 26 stored in a memory device of the central system 22, as in 118. In some embodiments, the historical data in the memory device can be gathered from the security devices 30, the security devices 34, and/or user input from the first smart home system 24 and/or the second smart home system 26. Then, the method 100 can include the central system 22 comparing the current data to the historical data to determine whether the suspicious incident is a potential threat, as in 120. When the central system 22 determines that the suspicious incident is not a potential threat, as in 120, the method 100 can include the central system 22 storing the current data on for future use, as in 116, and closing the suspicious incident, as in 117.

However, when the central system 22 determines that the suspicious incident is a potential threat, as in 120, the method 100 can include the central system transmitting a notification of the potential threat to experts or authorities, as in 122, and transmitting the notification of the potential threat to the user devices 28, 32 and initiating a security action to alleviate the potential threat, as in 124. Then, the method 100 can include central system 22 storing the current data for future use, as in 116, and closing the suspicious incident, as in 117.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   receiving, at a central system from a first smart home system, (1) a first notification of a suspicious incident detected at a first location monitored by the first smart home system and (2) current data related to the suspicious incident;
   transmitting a second notification of the suspicious incident from the central system to a second smart home system or a first user device, wherein the second smart home system monitors a second location neighboring the first location, and wherein the first user device is identified by the central system as being associated with the second smart home system;
   analyzing the current data at the central system to confirm or reject the suspicious incident;
   responsive to the second notification, receiving, at the central system from the second smart home system or the first user device, additional data related to the suspicious incident;
   when the suspicious incident is confirmed from the current data, determining whether a combination of the current data and the additional data is indicative of a potential threat; and
   when the combination of the current data and the additional data is indicative of the potential threat, storing the current data at the central system for future use and initiating a security action to alleviate the potential threat.

2. The method of claim 1 further comprising
   receiving the first notification at the central system responsive to user input at the first smart home system, wherein the user input is indicative of the current data.

3. The method of claim 1 further comprising:
   receiving the first notification at the central system responsive to security system devices of the first smart home system gathering the current data.

4. The method of claim 1 further comprising:
   comparing the combination of the current data and the additional data to historical data from the first smart home system or the second smart home system, wherein the historical data is stored in a memory device of the central system;
   identifying similarities between the historical data and the combination of the current data and the additional data; and
   responsive to identifying the similarities, determining that the combination of the current data and the additional data is indicative of the potential threat.

5. The method of claim 1 further comprising:
   transmitting the second notification from the central system to the first user device by publishing the second notification to a group chat thread accessible by the first user device and a second user device associated with the first smart home system.

6. The method of claim 1 further comprising:
   using the current data, historical data from the first smart home system or the second smart home system, and the additional data to determine whether the first location or the second location is a target of the potential threat,
   wherein the security action includes at least one of transmitting a third notification of the potential threat and or the security action to the first user device or a second user device associated with the first smart home system, arming the first smart home system or the second smart home system, and activating, devices of the first smart home system or the second smart home system to mimic an occupant being present at the first location or the second location.

7. The method of claim 1 further comprising:
   initiating the security action by transmitting a third notification of the potential threat from the central system to authorities.

8. The method of claim 1 further comprising:
   when the combination of the current data and the additional data is indicative of the potential threat, transmitting a third notification of the potential threat and/or the security action from the central system to the first user device or a second user device associated with the first smart home system.

9. A system comprising:
   a first smart home system that monitors a first location;

a second smart home system that monitors a second, location neighboring the first location; and a central system in communication with the first smart home system and the second smart home system, wherein the central system receives, from the first smart home system, (1) a first notification of a suspicious incident detected at the first location and (2) current data related to the suspicious incident and analyzes the current data to confirm or reject the suspicious incident, wherein the central system transmits a second notification of the suspicious incident to the second smart home system or a first user device identified by the central system as being associated with the second smart home system, wherein, responsive to the second notification, the central system receives additional data related to the suspicious incident from the second smart home system or the first user device, wherein, when the central system confirms the suspicious incident from the current data, the central system determines whether a combination of the current data and the additional data is indicative of a potential threat, and wherein, when the central system determines that the combination of the current data and the additional data is indicative of the potential threat, the central system stores the current data for future use and initiates a security action to alleviate the potential threat.

10. The system of claim 9 wherein the central system receives the first notification responsive to user input at the first smart home system, and wherein the user input is indicative of the current data.

11. The system of claim 9 wherein the central system receives the first notification responsive to security system devices of the first smart home system gathering the current data.

12. The system of claim 9 wherein the central system compares the combination of the current data and the additional data to historical data from the first smart home system or the second smart home system, wherein the historical data is stored in a memory device of the central system, wherein the central system identifies similarities between the historical data and the combination of the current data, and wherein, responsive to identifying the similarities, the central system determines that the combination of the current data and the additional data is indicative f the potential threat.

13. The system of claim 9 wherein the central system transmits the second notification to the first user device by publishing the second notification to a group chat thread accessible by the first user device and a second user device associated with the first smart home system.

14. The system of claim 9 wherein the central system uses the current data, historical data from the first smart home system or the second smart home system, and the additional data related to the suspicious incident to determine whether the first location or the second location is a target of the potential threat, and wherein the security action Includes at least one of transmitting a third notification of the potential threat and/or the security action to the first user device or a second user device associated with the first smart home system, arming the first smart home system or the second smart home system, and activating devices of the first smart home system or the second smart home system to mimic an occupant being present at the first location or the second location.

15. The system of claim 9 wherein the central system transmits a third notification of the potential threat to authorities.

16. The system of claim 9 wherein, when the central system determines that the combination of the current data and the additional data is indicative of the potential threat, the central system transmits a third notification of the potential threat and/or the security action to the first user device or a second user device associated with the first smart home system.

* * * * *